C. SCHICKERLING.
VEHICLE LAMP.
APPLICATION FILED MAR. 3, 1917.
1,262,394.
Patented Apr. 9, 1918.
3 SHEETS—SHEET 2.
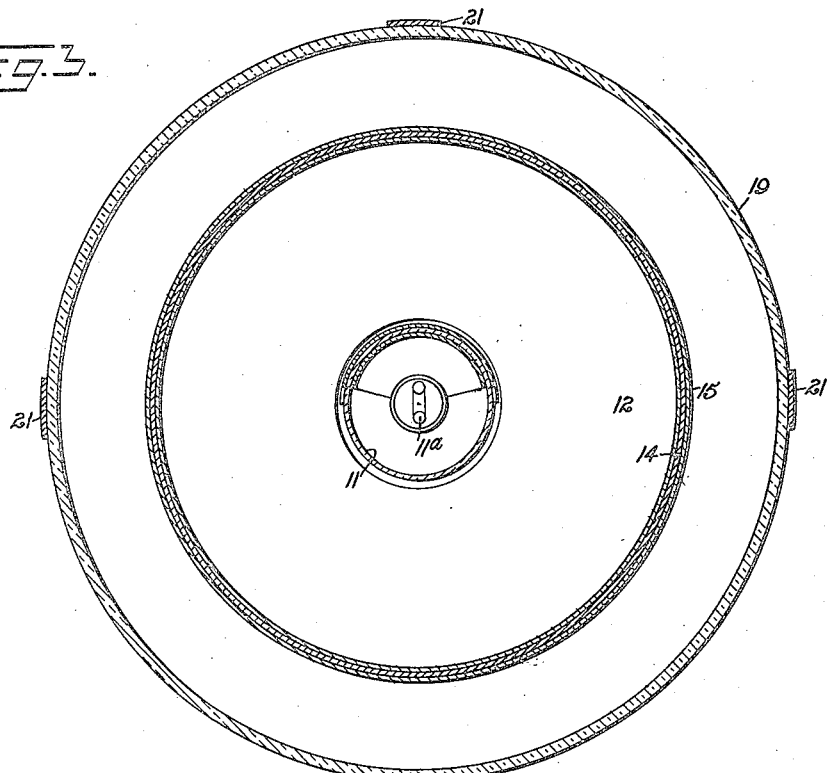
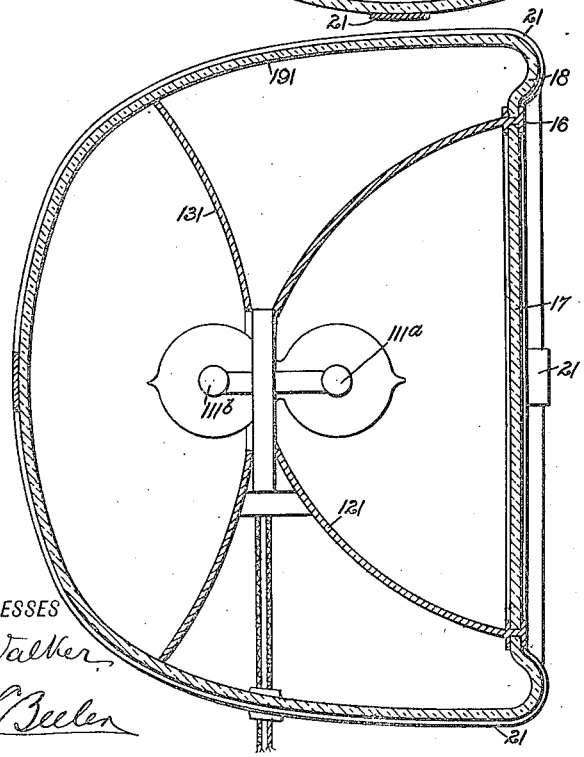
WITNESSES
INVENTOR
C. Schickerling
BY
ATTORNEYS

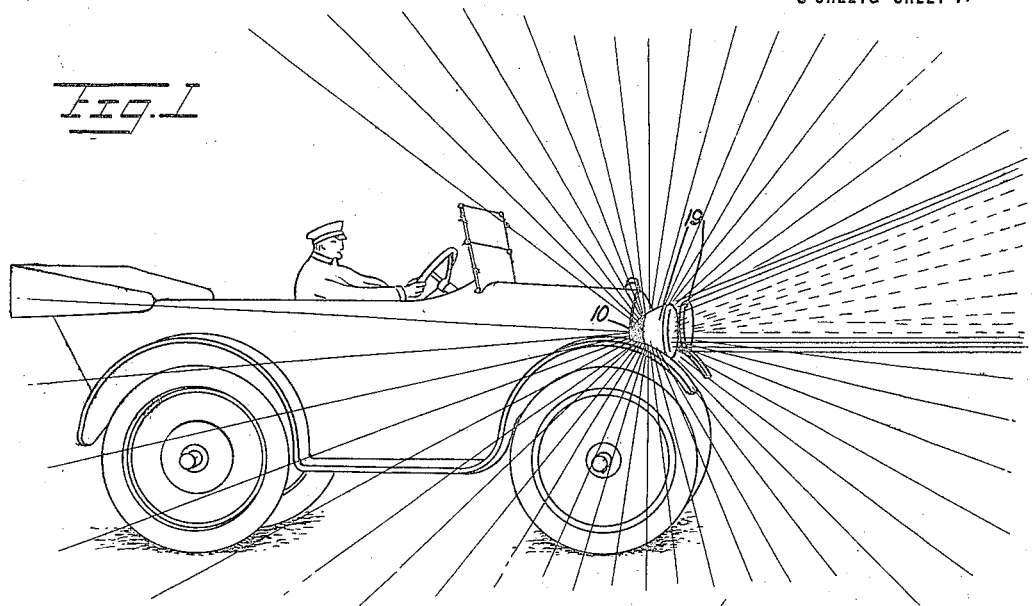
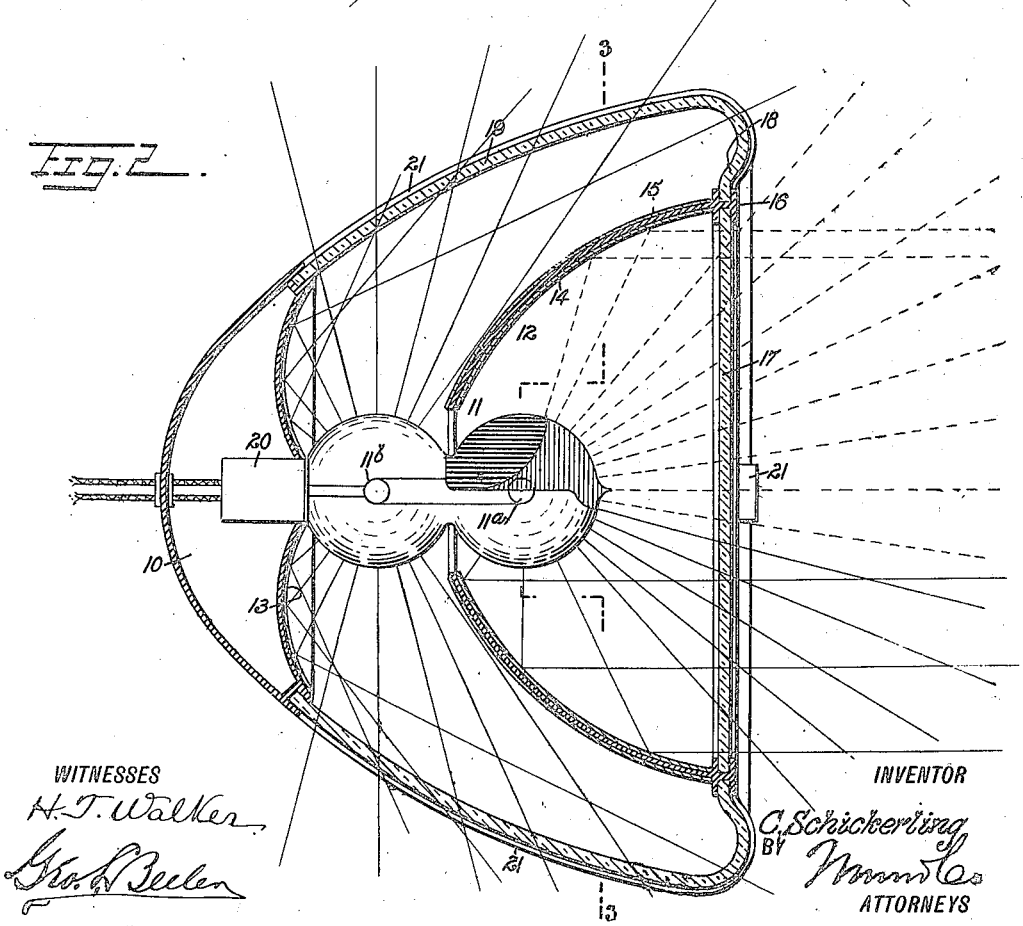

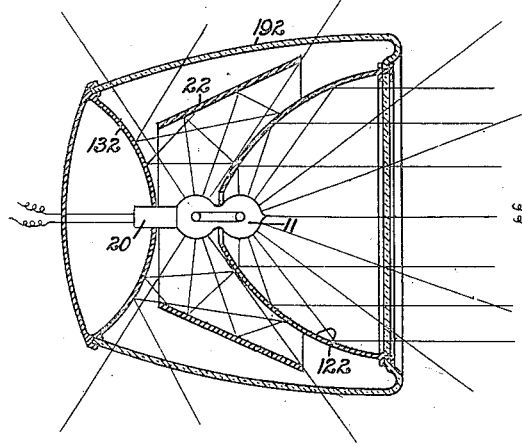
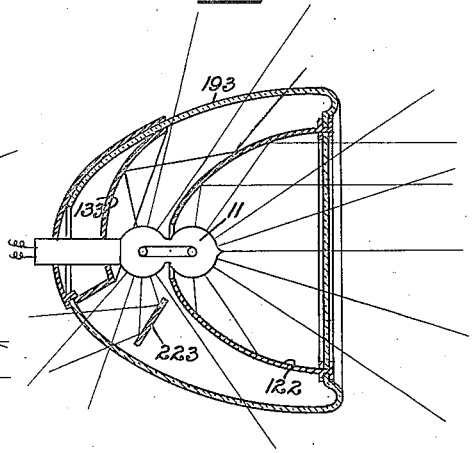
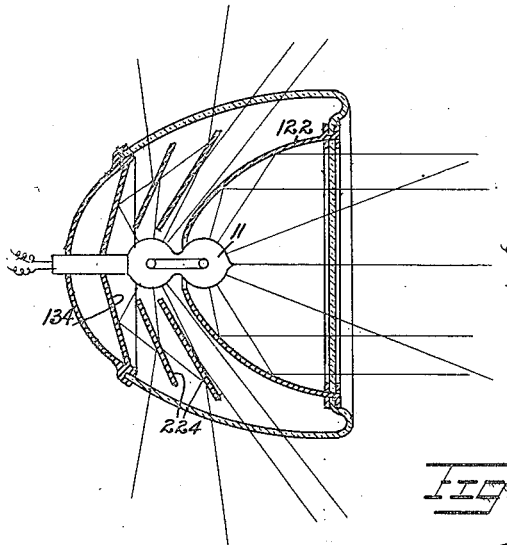
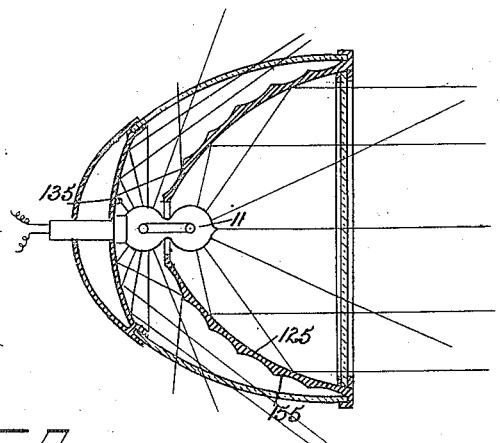
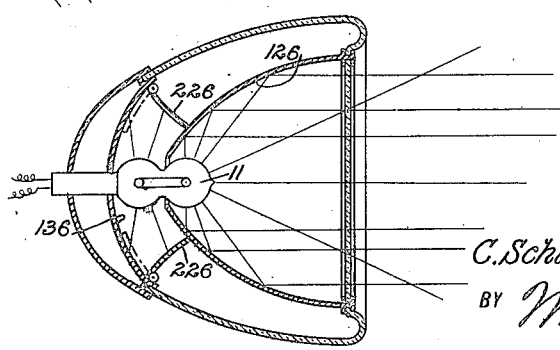

UNITED STATES PATENT OFFICE.

CONRAD SCHICKERLING, OF WEEHAWKEN, NEW JERSEY, ASSIGNOR, BY MESNE ASSIGNMENTS, TO LILLIE E. SCHICKERLING, OF WEEHAWKEN HEIGHTS, NEW JERSEY.

VEHICLE-LAMP.

1,262,394.  Specification of Letters Patent.  Patented Apr. 9, 1918.

Application filed March 3, 1917. Serial No. 152,337.

*To all whom it may concern:*

Be it known that I, CONRAD SCHICKERLING, a subject of the Emperor of Germany, and resident of Weehawken, in the county of Hudson and State of New Jersey, have invented a new and Improved Vehicle-Lamp, of which the following is a full, clear, and exact description.

This invention relates to lamps or headlights for automobiles, motor cycles, motor boats or other vehicles and has particular reference to the provision of means for illuminating the roadway at the sides as well as in front of the vehicle.

Among the objects therefore of this invention is to provide a new type or construction of lamp for a vehicle, said lamp being provided with a multiple reflecting device whereby one portion of the light is reflected forwardly while another portion thereof is reflected laterally or rearwardly depending upon the various uses to which the lamps may be applied.

Another object of the invention is to provide a duplex reflecting device coöperating with an electric lamp or its equivalent having a plurality of filaments or sources of light, one of such sources pertaining to each reflecting device.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a diagram indicating the effect of my improved lamp with respect to an automobile, lines being drawn to indicate the distribution of the light.

Fig. 2 is a vertical longitudinal section of one of the lamps indicated in Fig. 1.

Fig. 3 is a vertical transverse section on the broken line 3—3 of Fig. 2.

Fig. 4 is a vertical longitudinal section of a modification; and

Figs. 5 to 9 are longitudinal sectional diagrams of as many different specific types or forms of my improvement.

As above premised one of the objects of this improvement is to disperse the light or a portion of the light so that the sides of the roadway will be illuminated in addition to the more direct lighting of the roadway ahead of the vehicle. I aim, however, to effect this side illumination without materially detracting from the intensity of the light in front. In fact in my improved arrangement the effect with the light ahead of the vehicle especially on the roadway directly in front is intensified rather than diminished. I provide therefore a lamp including a reflecting means of a duplex or multiple nature, one reflector acting in the usual manner to throw the light forwardly and downwardly upon the roadway, while another portion of the reflecting means serves to disperse a portion of the light laterally in any suitable direction with respect to the axis of the lamp. With respect to the main headlight and the source of light coöperating therewith, I prefer to employ a special type of lamp such as is fully set forth and claimed in my copending application for electric lamp attachment filed February 3, 1917, Serial No. 146,387, in which one portion of the lamp globe is clear, another portion is translucent and a third portion is opaque with an internal reflector acting to intensify the light delivered from the lamp through the clear portion thereof. I wish it to be understood, however, that I do not mean to be limited unnecessarily to any particular type of lamp in the present instance.

Referring now more particularly to Fig. 2 and the application of the type of lamp shown therein to automobile practice, I provide a reflector comprising a base or socket portion 10 into which is fitted a lamp 11 having preferably two filaments or light centers 11$^a$ and 11$^b$ pertaining respectively to the main headlight reflector 12 and the side light reflector 13.

The reflector casing may be constructed in any suitable manner and the headlight portion 12 thereof is preferably of a strong self supported structure preferably opaque and provided in its inner or concave surface with a reflecting medium 14 and on its outer or convex surface with another reflecting medium 15. At the front edge of the reflector 12 is formed a metal band or holder 16 into which is fitted a lens or window 17 similar to such lenses commonly in use while the outer edge of the ring 16 is adapted to receive and hold the front end and inwardly turned flange 18 of an outer globe 19 made preferably of clear glass or partly frosted or tinted as desired. The main portion of this globe is spaced laterally from the convex reflector 15 and has its rear edge supported in the base portion 10 of the entire structure.

The lamp 11 as shown in Fig. 2 is secured at its base in the socket 20 in the usual manner and by providing a duplex filament or a plurality of filaments one for each reflector device the full strength of the light is realized for each portion. The intensity of the two filaments may be variously arranged or related to each other according to the desire of the user of the lamp, but ordinarily they may be substantially equal or I may provide a lamp of the elongated design extending from one reflector to the other, a portion of the filament thereof extending into each concavity.

The reflector 13 may be of any suitable configuration or possessed of any desired illuminating property depending upon the form of the other parts of the device. As shown in Fig. 2, it is of annular concave form and provided with a reflecting medium in its concave surface, the effect of which is to disperse the light outwardly through the sides of the globe 19 as well as forwardly through the rounded front portion of the globe 18. A part of the light from the filament 11$^b$ is directed laterally through the globe while other parts of the light are reflected one or more times upon or between the reflecting surfaces of the parts 13 and 15. I therefore provide a sort of daylight effect all around the machine although ordinarily the lateral light is not so intense as the forward and downward beam of light from the headlight reflector, the opaque base and reflector, however, prevent any of the light extending rearwardly so as to blind the occupants of the vehicle or interfere in any manner with the control of the machine.

In Fig. 4 I show a somewhat diagrammatic representation of a lamp embodying the same general principles as above set forth in that there are two lamps or lamp portions pertaining respectively to independent reflector devices, but in this form of the invention the lamp device is one that is supported intermediate of the filaments and between the light concavities or reflectors. The reflector 121 coöperating with the lamp filament 111$^a$ serves as a headlight reflector and is provided with an annular frame 16 holding the front window or lens 17 as in Fig. 2. The filament 111$^b$ coöperates with the reflector 131 which acts laterally and rearwardly only. The globe 191 may, in some instances be of tinted glass for the purpose of varying the light indication as may be desired. For example this construction may be employed as a side lamp, the light from which extending forwardly will be white, as usual, while the light extending rearwardly may be red, green, or some other tint. The front portion 18 of the globe is secured as shown in the annulus 16 and in any of the forms of the invention longitudinal metal strips 21 may be employed to reinforce the entire construction.

In Fig. 5 the lamp 11 coöperates with the reflector 122. The reflector 122 is the headlight having its usual properties or as already set forth in connection with Fig. 2 but in the rear of this reflector and between the lamp and the case 192 is provided a frusto-conical shutter 22 which may be of any suitable material, either opaque or translucent and provided, if desired, on its inner surface with a reflecting medium. By spacing the front end of the shutter 22 laterally from the outer reflecting surface of the member 122, a portion of the light from the rear filament is dispersed forwardly and laterally from the front portion of the globe 192. The reflector 132 at the base portion of the device is convex as shown and is spaced rearwardly from the rear end of the shutter whereby a portion of the light is dispersed laterally and rearwardly from the rear portion of the globe.

In Fig. 6 I show a modification of the device in which the rear reflector 133 is of irregular configuration, extending farther forwardly on one side than on another, and opposite or in front of the shutter side is arranged a reflecting shutter 223 which serves to reflect a portion of the light from the rear filament rearwardly while the main portion of such light is dispersed laterally and forwardly through the globe 193.

In Fig. 7 the reflector 122, as in Fig. 6, is the headlight reflector, but in this form of the invention I show the rear reflector 134 as of conical form with the inner surface thereof acting as a reflecting medium which in conjunction with a plurality of reflecting shutters 224 arranged between the two main reflectors, serves to spread an intense light laterally all around the sides of the lamp.

Fig. 8 shows a head light reflector 125 coöperating with the lamp 11 as before described but the outer or rear reflecting surface 155, as shown, is of fluted nature. The rear reflector 135 as shown is concave, the concave surface coöperating with the fluted surface aforesaid to spread intense light laterally from the rear filament of the lamp.

In Fig. 9 the main reflectors 126 and 136 are both concave and have the same general relationship with the duplex lamp as pointed out in the other forms of the invention. I show in this figure, however, the idea of employing one or more movable or adjustable shutters 226 in any convenient place, as for example between the two main reflectors and operated by any suitable means, for the purpose of varying the parts of the device through which the light may be dispersed laterally or in other words whereby a part of the light may be obstructed according to varying circumstances.

In all forms of the device the lamp structure is of compact and neat appearance and may be so designed as to deflect an intense amount of light variously distributed.

I claim:—

1. In a vehicle lamp the combination of a headlight reflector having a central opening, a rearwardly and laterally acting reflector spaced rearwardly from said opening, and a lamp coöperating with both reflectors, one portion of the lamp being in the space between the reflectors while another portion thereof extends forwardly through said opening within the headlight reflector.

2. In a vehicle lamp the combination of a plurality of reflectors and a lamp coöperating therewith, one of the reflectors serving to throw the light in one direction and the other in other directions, said lamp comprising a single base and a plurality of filaments pertaining to the respective reflectors.

3. In a vehicle lamp, the combination of a front headlight reflector, a rear headlight reflector, a source of light coöperating with each of said reflectors, and means for reflecting the light coming from the rear reflector outwardly from the lamp in the rear of the front edge thereof.

4. In a vehicle lamp, the combination of a front headlight reflector for projecting rays forwardly, a source of light for said reflector, a rear reflector spaced from said front reflector, a source of light for said rear reflector, and reflecting means disposed in the space between said front and rear reflectors for reflecting the light from said rear reflector out of the lamp in the rear of the front edge thereof.

5. In a vehicle lamp, the combination of a front headlight reflector having an opening in its center, a rear reflector spaced from said front reflector, a duplex lamp located in the space between the two reflectors and having one end extending through said central opening and means disposed in the space between the two reflectors for reflecting the light coming from the rear reflector outside of the lamp in the rear of the front edge of the lamp.

6. In a vehicle lamp the combination of a headlight reflector of concavo convex form and provided with reflecting mediums on both the concave and convex surfaces, another reflector spaced rearwardly from the first mentioned reflector, and means to illuminate the interior of each reflector space, a portion of the light reflected by the rear reflector being again reflected by the convex portion of the first mentioned reflector outside of the lamp in the rear of the front edge of the lamp.

CONRAD SCHICKERLING.